United States Patent
Wang et al.

(10) Patent No.: US 11,050,987 B2
(45) Date of Patent: Jun. 29, 2021

(54) METHOD AND APPARATUS FOR DETERMINING FISHEYE CAMERA SHADOW CORRECTION PARAMETER

(71) Applicant: Shanghai Xiaoyi Technology Co., Ltd., Shanghai (CN)

(72) Inventors: Xiaomin Wang, Shanghai (CN); Tingshan Lyu, Shanghai (CN); Chixiang Huang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/296,462

(22) Filed: Mar. 8, 2019

(65) Prior Publication Data
US 2019/0281269 A1 Sep. 12, 2019

(30) Foreign Application Priority Data
Mar. 9, 2018 (CN) .......................... 201810193867.1

(51) Int. Cl.
*H04N 9/77* (2006.01)
*G06T 7/80* (2017.01)
*G06F 17/18* (2006.01)
*H04N 5/225* (2006.01)

(52) U.S. Cl.
CPC ............... *H04N 9/77* (2013.01); *G06F 17/18* (2013.01); *G06T 7/80* (2017.01); *H04N 5/2252* (2013.01)

(58) Field of Classification Search
CPC ...... H04N 9/77; H04N 5/2252; H04N 5/2254; G06T 7/80; G06T 2207/20021; G06T 2207/20012; G06T 2207/10024; G06T 5/008; G06F 17/18
See application file for complete search history.

(56) References Cited

U.S. PATENT DOCUMENTS

| | | | |
|---|---|---|---|
| 5,130,794 A * | 7/1992 | Ritchey | H04N 5/265 348/39 |
| 2008/0118180 A1* | 5/2008 | Kamiya | G06T 3/0062 382/275 |
| 2010/0045773 A1* | 2/2010 | Ritchey | H04N 5/2259 348/36 |
| 2018/0268528 A1* | 9/2018 | Matsushita | H04N 5/23238 |
| 2018/0359399 A1* | 12/2018 | Ito | H04N 5/235 |

FOREIGN PATENT DOCUMENTS

| | | |
|---|---|---|
| CN | 106161883 A | 11/2016 |
| CN | 106170065 A | 11/2016 |
| CN | 106506905 A | 3/2017 |
| JP | S59214740 A | 12/1984 |

OTHER PUBLICATIONS

SIPO First Office Action corresponding to Application No. CN201810193867.1 dated Dec. 4, 2019.

* cited by examiner

*Primary Examiner* — Gevell V Selby
(74) *Attorney, Agent, or Firm* — Cantor Colburn LLP

(57) ABSTRACT

A method for determining a fisheye camera shadow correction parameter, comprising: capturing and acquiring a raw image using a fisheye camera that is not installed in an outer housing; obtaining the raw image from the fisheye camera; performing statistics on luminance information and chrominance information in each block of the raw image; and calculating a correction parameter for the fisheye camera based on the luminance information and the chrominance information of each block.

12 Claims, 4 Drawing Sheets

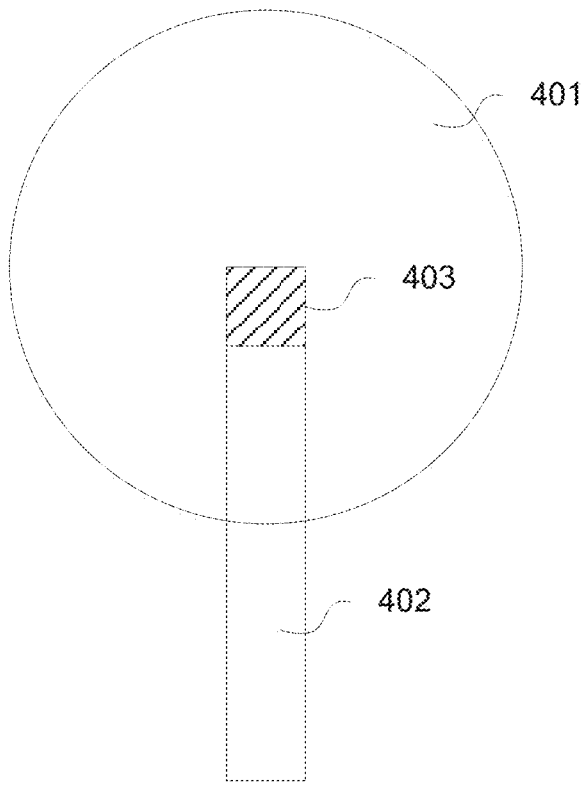

Figure 4

Obtain a correction parameter for a fisheye camera, said correction parameter being calculated and acquired by means of the following method: obtaining a raw image from the fisheye camera, said raw image being captured and acquired when said fisheye camera is not installed in an outer housing; performing statistics on the luminance information and the chrominance information in each block of said raw image; and calculating the correction parameter for said fisheye camera on the basis of the luminance information and the chrominance information of each block — S501

Perform correction using the correction parameter on an image captured by said fisheye camera — S502

Figure 5

METHOD AND APPARATUS FOR DETERMINING FISHEYE CAMERA SHADOW CORRECTION PARAMETER

CROSS-REFERENCE TO RELATED APPLICATION

This application is based upon and claims priority from Chinese Patent Application No. 201810193867.1, filed on Mar. 9, 2018, the disclosure of which is expressly incorporated herein by reference in its entirety.

TECHNICAL FIELD

The present disclosure relates to the field of image processing technology, and more particularly to a fisheye camera, storage medium, methods of determining a fisheye camera shadow correction parameter, correction, and devices therefor.

BACKGROUND

Video cameras have improved in accordance with advancements in technology, yet still face certain problems. In particular, when a light beam passes through the lens of a video camera, light refraction causes the light beam to bend. The bending of the light produces different levels of luminance on the overall sensor such that the portion in the middle is much brighter than the portions near the rim. This type of distortion is referred to as lens shading or vignetting. A variation or a defect on the lens will increase the unevenness of light penetrating through the lens. Moreover, as a result of interaction with the lens case, the light beam may be obstructed or unable to pass through. Therefore, as a result of defects on the lens and image forming medium (film or a digital sensor group), the light that passes through the lens and forms an image on a film plane (a digital sensor or film) is unevenly abated on the imaging plane and in the color spectrum. In order to obtain an image with uniform luminance, the distortion caused by lens shading must be corrected or otherwise mitigated.

In currently available technology, the angle of a panoramic fisheye camera is 220 degrees, the field of view (FOV) of a finished camera is 190 degrees, and the outer housing is black. The image formed is smaller than the sensor; therefore, the image is square-shaped, and the rest of the round interior imaging area is black. A typical shadow correction algorithm divides the square-shaped raw image into areas to perform correction and compensation.

However, when performing shadow correction on an image obtained by a finished camera, with currently available technology, the black circular rim of a lens affects the statistics on the average value for luminance or chrominance of blocks corresponding to where the black circular rim is located, so that the corrected normal imaging area near the rim of the lens contains portions that appear too bright or appear to be an abnormal color, thus affecting the imaging result when the camera is used by a user.

SUMMARY

The present disclosure addresses methods for improving fisheye camera shadow correction. It is an object of the present disclosure to improve the current state of the art, to solve the aforementioned problems, and to provide improved methods for correcting fisheye camera shadow.

According to a first aspect of the invention, a fisheye camera shadow correction parameter determination method is provided. The method comprises: obtaining a raw image from a fisheye camera, the raw image being captured and acquired when the fisheye camera is not installed in an outer housing; performing statistics on luminance information and chrominance information in each block of said raw image; and calculating a correction parameter for the fisheye camera on the basis of the luminance information and the chrominance information of each block.

By capturing and acquiring the raw image when the fisheye camera is not installed in an outer housing, the reflection or obstruction ordinarily caused by an outer housing of the fisheye camera during shadow correction may be avoided. The methods disclosed herein may therefore ensure even luminance of the raw image so that the accuracy of the correction parameter calculated on the basis of such raw image is ensured, thereby improving the resulting shadow correction.

The raw image may be captured and acquired in an integrating sphere when said fisheye camera is not installed in an outer housing. The fisheye camera may be disposed and secured in the middle of the integrating sphere by means of a jig. The field of view of a fisheye camera is comparatively large—normally more than 180 degrees. Capturing the raw image while the fisheye camera is disposed in an integrating sphere ensures that the correction environment features even luminance in the field of view and further ensures the accuracy of the obtained correction parameter.

The fisheye camera may also comprise two fisheye lenses configured to capture first and second raw images. The first and second raw images are separately obtained then separately used to calculate correction parameters for the two fisheye lenses.

According to another aspect of the invention, a method for correcting fisheye camera shadow is provided. The method comprises: obtaining a correction parameter for a fisheye camera, wherein the correction parameter is calculated and acquired by obtaining a raw image from the fisheye camera when said fisheye camera is not installed in an outer housing; performing statistics on luminance information and chrominance information in each block of said raw image; and calculating the correction parameter for said fisheye camera on the basis of the luminance information and the chrominance information of each block.

The fisheye camera may comprise two fisheye lenses, wherein obtaining the correction parameter comprises: separately obtaining correction parameters for the two fisheye lenses.

According to another aspect of the invention, a fisheye camera shadow correction parameter determination device is provided. The fisheye camera shadow correction parameter determination device comprises: a raw image obtaining module adapted to obtain a raw image from a fisheye camera, the raw image being captured and acquired by the fish eye camera when said fisheye camera is not installed in an outer housing; a statistics module adapted to perform statistics on luminance information and chrominance information in each block of said raw image; and a correction parameter calculation module adapted to calculate a correction parameter for the fisheye camera based on the luminance information and the chrominance information of each block.

The raw image may be captured and acquired in an integrating sphere when said fisheye camera is not installed in an outer housing. The fisheye camera may be disposed and secured in the middle of the integrating sphere by means of a jig.

The fisheye camera may comprise two fisheye lenses for capturing first and second raw images, wherein the raw image obtaining module separately obtains the first raw image and a second raw image from the two fisheye lenses, and the first and second raw images are separately used to calculate correction parameters for the two fisheye lenses.

According to another aspect of the invention, a fisheye camera shadow correction device is provided. The fisheye camera shadow correction device comprises: a correction parameter obtaining module adapted to obtain a correction parameter for a fisheye camera, the correction parameter being calculated and acquired by obtaining a raw image from the fisheye camera when said fisheye camera is not installed in an outer housing; performing statistics on luminance information and chrominance information of each block of the raw image; and calculating the correction parameter for said fisheye camera on the basis of the luminance information and the chrominance information of each block; and a correction module adapted to perform correction using said correction parameter on an image captured by the fisheye camera.

The fisheye camera may comprise two fisheye lenses, wherein the correction parameter obtaining module separately obtains correction parameters for the two fisheye lenses.

According to another aspect of the invention, a storage medium containing computer instruction is provided. When the computer instruction is run, steps of the fisheye camera shadow correction parameter determination method or steps of the fisheye camera shadow correction method are executed.

According to another aspect of the invention, a fisheye camera comprising a storage device and a processor are provided. The storage device stores a computer instruction that may be run on said processor and when the processor runs the computer instruction, steps of the fisheye camera shadow correction parameter determination method or steps of the fisheye camera shadow correction method are executed.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

FIG. 4 is a diagram illustrating a relative positional relationship between a jig and an integrating sphere according to an aspect of the present invention;

FIG. 5 is a flowchart illustrating a fisheye camera shadow correction method according to an aspect of the present invention;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
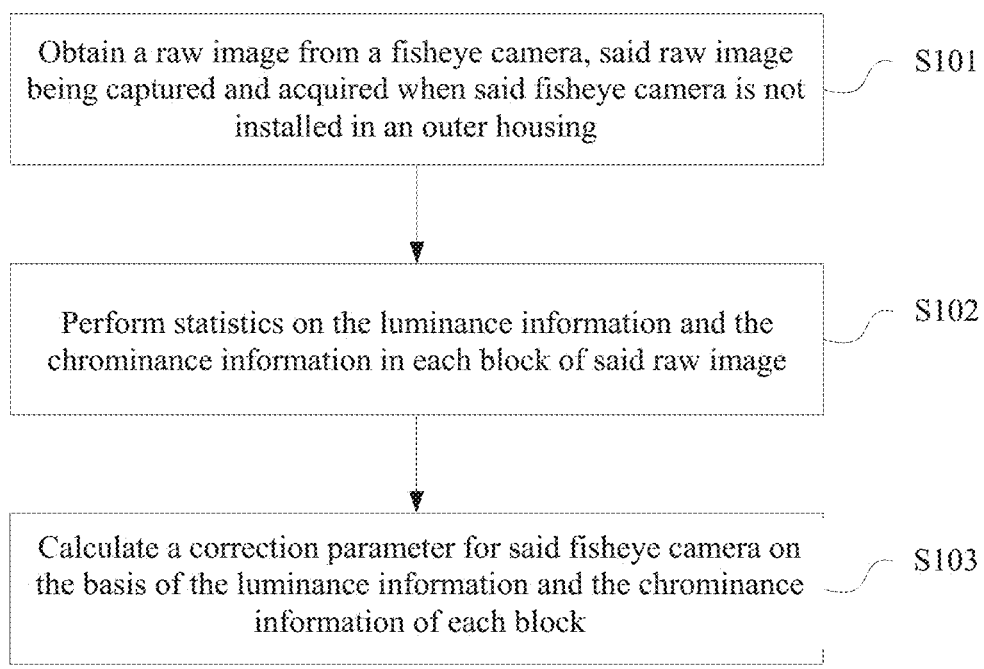
FIG. 1 is a flowchart illustrating a fisheye camera shadow correction parameter determination method according to one aspect of the invention.

FIG. 1 is a flowchart illustrating a fisheye camera shadow correction parameter determination method according to a first aspect of the invention.

The fisheye camera shadow correction parameter determination method illustrated in FIG. 1 may comprise the following steps:

Step S101: obtain a raw image from a fisheye camera, said raw image being captured and acquired when said fisheye camera is not installed in an outer housing;

Step S102: perform statistics on the luminance information and the chrominance information in each block of the raw image; and Step S103: calculate a correction parameter for the fisheye camera based on the luminance information and the chrominance information of each block.

Though disclosed for use with a fisheye camera, it is to be understood that the present method may be used on other terminal devices, e.g., a computer, a tablet computer, etc.

As previously discussed, there are numerous drawbacks to using an outer housing with a fisheye camera, including obstruction and reflection. When the outer housing obstructs the fisheye camera, it causes a bright ring to appear on the rim of the imaging area of a finished camera. The outer housing also causes a reflection which causes the luminance or the color to appear uneven when the fisheye camera is imaging.

Figure 2:
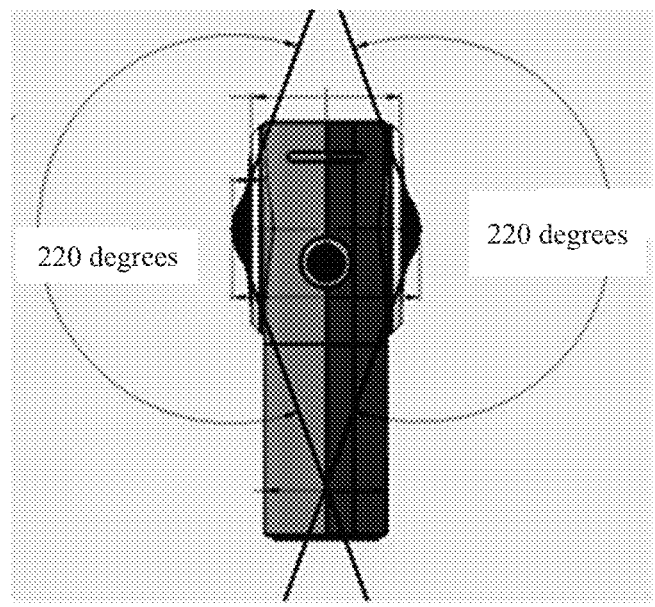
FIG. 2 is a diagram illustrating the size of the field of view of a fisheye camera not installed in an outer housing according to an aspect of the present invention.
Figure 3:
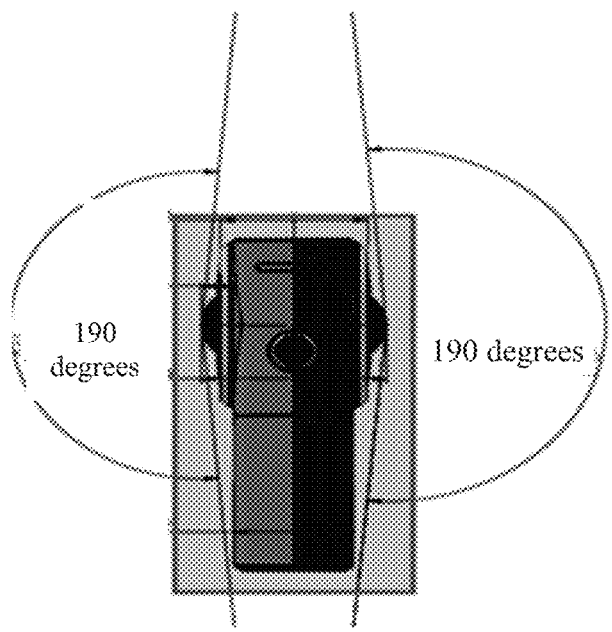
FIG. 3 is a diagram illustrating the size of the field of view of a fisheye camera installed in an outer housing according to an aspect of the present invention.

FIGS. 2 and 3 illustrate the effect that an outer housing has on a fisheye camera's FOV. Both cameras comprise dual fisheye lenses thus forming a panoramic fisheye camera. As seen in FIG. 2, the fisheye camera (also referred to as a fisheye lens) has a FOV of 220 degrees. When the fisheye camera is installed in an outer housing as illustrated in FIG. 3, the FOV narrows to 190 degrees.

Embodiments illustrated herein avoid the aforementioned drawbacks by capturing the raw image without an outer housing. Since the fisheye camera is not used in conjunction with an outer housing, the fisheye camera has a larger view and the resultant image has even luminance. While dual lenses are illustrated, the fisheye camera may also be formed by a single fisheye lens. The field of view of the fisheye camera may also be any other implementable angle; thus, the number of lenses and FOV are illustrative and non-limiting.

To further ensure even luminance, obstructive objects on the body of the fisheye camera, such as a wire lead, may be secured to prevent bright or dark spots from forming in the raw image. This may also serve to ensure the accuracy of the correction parameter calculated in step S103.

The raw image may be divided into a plurality of blocks. If the raw image is an RGB image, then the luminance information and the chrominance information of each block may be acquired by performing statistics using information in the R channel, G channel, and B channel of the raw image; for example, luminance $L=⅓(R+G+B)$. Persons having ordinary skill in the art will understand that the RGB image may also be converted into a YUV image, a YCrCb image, etc. The average luminance information and chrominance information of each block may be calculated using this data.

More specifically, the luminance information of each block may be the average luminance value of the block, and the chrominance information of each block may be the average chrominance value of the block.

The correction parameter may comprise a luminance parameter and a chrominance parameter. The luminance parameter may be a first ratio of the average luminance value of a central block and the average luminance value of each block; the chrominance parameter may be a second ratio of the average chrominance value of a central block and the average chrominance value of each block.

The luminance and chrominance parameters may be quantified using any of a variety of methods as would occur to one having ordinary skill in the art. For example, the luminance parameter may be quantified as the product of the first ratio and any implementable preset coefficient, while the chrominance parameter may be quantified as the product of the second ratio and any implementable preset coefficient. The method for dividing the raw image into blocks and algorithm used to calculate the correction parameter are similarly illustrative. Persons having ordinary skill in the art should understand that any other implementable algorithm may also be used to calculate the correction parameter.

The embodiments disclosed herein determine the correction parameter using a raw image that was captured and acquired by the fisheye camera in accordance with the methods discussed above. By capturing and acquiring the raw image when the fisheye camera is not installed in an outer housing, the aforementioned drawbacks are prevented, even luminance of the raw image and accuracy of the correction parameter are ensured, and shadow correction is improved.

A correction parameter table may be stored in the fisheye camera to facilitate the retrieval of the correction parameter when the camera captures an image. Specifically, the correction parameter acquired by undertaking the steps illustrated in FIG. 1 may be stored in the fisheye camera and subsequently retrieved when shadow correction needs to be performed on an image captured by the fisheye camera.

In one preferred example embodiment of the present invention, said raw image is captured and acquired in an integrating sphere when said fisheye camera is not installed in an outer housing.

FIG. 4 illustrates the positional relationship between a jig and an integrating sphere. The jig includes a slide guide 402 and a slot 403 and the integrating sphere 401 may be a hollow sphere having an interior wall coated with a white diffusing material. The integrating sphere may be referred to as a photometric sphere, a light-passing sphere, etc.

The fisheye camera may be slid to the middle of the integrating sphere 401, e.g., the center of the sphere, by means of the slide guide 402. The fisheye camera may be secured in the middle of the integrating sphere 401 by means of the slot 403. Disposing and securing the fisheye camera in the middle of the integrating sphere by means of the jig helps to ensure that the fisheye camera captures and obtains the raw image. Because the field of view of a fisheye lens is comparatively large, and the fisheye lens of a panoramic camera, in particular, is even larger—normally more than 180 degrees, the correction environment provided by an integrating sphere featuring even illumination in a large angle range further ensures even luminance of the raw image, which in turn ensures accurate correction.

A process for calculating the correction parameter for a panoramic fisheye camera may be as follows: secure the wire lead and other obstructive camera body parts; dispose the fisheye camera on the jig of the integrating sphere such that the front of the fisheye camera faces forward; start the jig manually or automatically; and begin the correction process in an environment where it is ensured that the luminance is even and uniform in a 220-degree field of view and no obstruction is present in the correction process; after undergoing the correction, the fisheye camera is turned around manually or automatically by the jig, and the correction process is entered.

When the fisheye camera comprises two opposing fisheye lenses, as is illustrated in FIG. 2, a correction parameter needs to be separately calculated for each of the lenses and separately stored in the camera. Accordingly, step S101 may comprise the steps of: obtaining a first raw image captured by the first fisheye lens, separately obtaining a second raw image captured by the second fisheye lens, and separately to calculating the correction parameters for the two fisheye lenses.

FIG. 5 illustrates a fisheye camera shadow correction method. The method may comprise the following steps:

Step S501: obtaining a correction parameter for a fisheye camera, said correction parameter being calculated and acquired by means of the following method: obtaining a raw image from the fisheye camera, said raw image being captured and acquired when said fisheye camera is not installed in an outer housing; performing statistics on the luminance information and the chrominance information in each block of said raw image; and calculating the correction parameter for said fisheye camera on the basis of the luminance information and the chrominance information of each block;

Step S502: performing correction using said correction parameter on an image captured by said fisheye camera.

In one specific embodiment, the correction parameter obtained in Step S501 is calculated and acquired by means of the method illustrated in FIG. 1.

Due to the high accuracy of the calculated correction parameter, the use of the correction parameter in Step S502 may ensure the results of the correction on the image captured by the fisheye camera.

Specifically, the correction parameter may be a luminance compensation value and a chrominance compensation value for each block in the image. More specifically, the luminance compensation value may be a first ratio of the average luminance value of a central block and the average luminance value of each block; the chrominance compensation value may be a second ratio of the average chrominance value of a central block and the average chrominance value of each block.

After performing shadow correction using the correction parameter, the image will not contain bright spot(s), bright ring(s), or abnormally colored portions in the rim region, thus indicating that the correction result is good.

If the fisheye camera (e.g., a panoramic fisheye camera) comprises two fisheye lenses as discussed and described above with respect to FIG. 2, Step S501 my be modified such that the correction parameters of each fisheye lenses is obtained separately.

Figure 6:
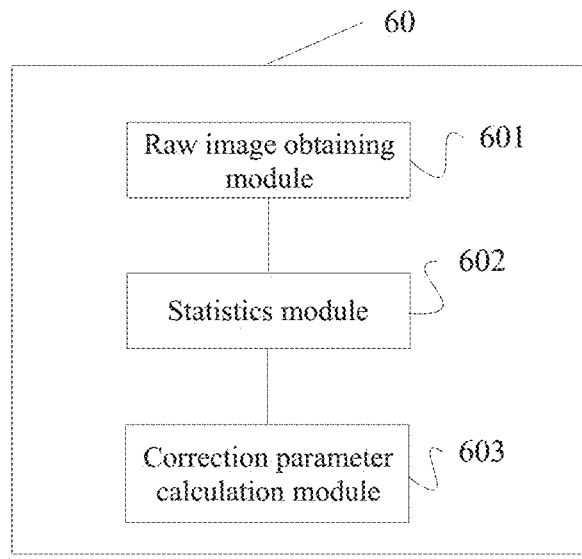
FIG. 6 is a structural diagram illustrating a fisheye camera shadow correction parameter determination device according to an aspect of the present invention.

FIG. 6 illustrates a fisheye camera shadow correction parameter determination device 60. Device 60 may comprise a raw image obtaining module 601, a statistics module 602, and a correction parameter calculation module 603. Raw image obtaining module 601 is adapted to obtain a raw image from a fisheye camera, said raw image being captured and acquired when said fisheye camera is not installed in an outer housing; statistics module 602 is adapted to perform statistics on the luminance information and the chrominance information in each block of said raw image; and correction parameter calculation module 603 is adapted to calculate a correction parameter for the fisheye camera on the basis of the luminance information and the chrominance information of each block of said raw image.

When determining the correction parameter, the example embodiment of the present invention uses a raw image that is captured and acquired by the fisheye camera not installed in an outer housing. Capturing and acquiring said raw image by the fisheye camera not installed in an outer housing may avoid the impact of reflection or obstruction caused by the outer housing of the fisheye camera during imaging; therefore, the luminance of the raw image may be ensured to be even so that the accuracy of the correction parameter calculated on the basis of such raw image is ensured, improving the result of shadow correction.

Preferably, said raw image is captured and acquired in an integrating sphere when said fisheye camera is not installed in an outer housing.

In one specific embodiment of the present invention, said fisheye camera is disposed and secured in the middle of said integrating sphere by means of a jig.

The principles and operation of fisheye camera shadow correction parameter determination device 60 may be more fully understood in light of the method and apparatuses disclosed in FIGS. 1-5.

Figure 7:
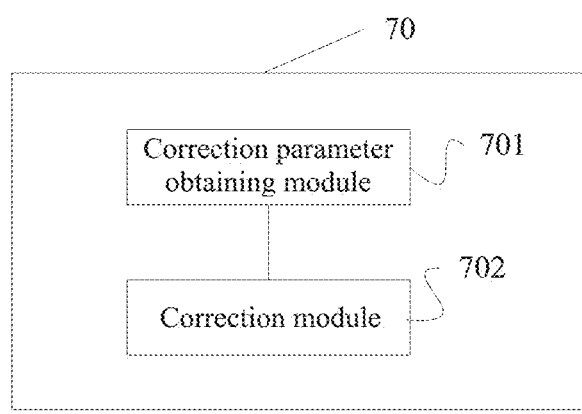
FIG. 7 is a structural diagram illustrating a fisheye camera shadow correction device according to an aspect of the present invention.

FIG. 7 illustrates a fisheye camera shadow correction device 70. Device 70 may comprise a correction parameter obtaining module 701 and a correction module 702.

Correction parameter obtaining module 701 is adapted to obtain a correction parameter for a fisheye camera, said correction parameter being calculated and acquired by means of the following method: obtaining a raw image from the fisheye camera, said raw image being captured and acquired when said fisheye camera is not installed in an outer housing; performing statistics on the luminance information and the chrominance information in each block of said raw image; and calculating the correction parameter for said fisheye camera on the basis of the luminance information and the chrominance information of each block.

Correction module 702 is adapted to perform correction using said correction parameter on an image captured by said fisheye camera. Where the fisheye camera comprises two fisheye lenses, the correction parameter obtaining module 701 separately obtains correction parameters for each of the two fisheye lenses.

The principles and operation of fisheye camera shadow correction device 70 may be more fully understood in light of the method and apparatuses disclosed in FIGS. 1-5.

A storage medium (not shown) may be used in conjunction with the illustrated embodiments. The storage medium may comprise a ROM, a RAM, a magnetic disk, or an optical disc, etc. The storage medium may further comprise a non-volatile storage device or a non-transitory storage device, etc. According to a preferred embodiment, a computer instruction is stored on the storage medium, whereby running the instruction executes the steps of the method illustrated in FIG. 1 or the steps of the method illustrated in FIG. 5.

According to another embodiment, the fisheye camera may comprise a storage device and a processor, wherein the storage device stores a computer instruction that may be run on said processor, and running the instruction executes the method illustrated in FIG. 1 or the method illustrated in FIG. 5.

It will be understood that any person having ordinary skill in the art may make various alterations and changes without departing from the essence and scope of the present disclosure. Accordingly, the disclosure is not limited by embodiments disclosed herein and the scope of protection should be that as defined by the claims.

What is claimed is:

1. A method for determining a fisheye camera shadow correction parameter, comprising:
   capturing and acquiring a raw image using a fisheye camera when said fisheye camera is not installed in an outer housing;
   obtaining the raw image from the fisheye camera;
   performing statistics on luminance information and chrominance information in each block of the raw image; and
   calculating a correction parameter for the fisheye camera based on the luminance information and the chrominance information of each block;
   wherein the luminance information of each block may be an average luminance value of the block, and the chrominance information of each block may be an average chrominance value of the block;
   wherein the correction parameter may comprise a luminance parameter and a chrominance parameter, the luminance parameter may be a first ratio of the average luminance value of a central block and the average luminance value of each block, and the chrominance parameter may be a second ratio of the average chrominance value of a central block and the average chrominance value of each block;
   wherein the raw image is captured and acquired in an integrating sphere;
   wherein the fisheye camera is disposed and secured in a middle of the integrating sphere using a jig.

2. The method of claim 1, wherein the fisheye camera comprises two fisheye lenses and the raw image includes a first raw image corresponding to a first of the two fisheye lenses, and a second raw image corresponding to a second of the two fisheye lenses, the method further comprising:
   separately obtaining the first and second raw images;
   using the first raw image to calculate a correction parameter of the first fisheye lens; and
   using the second raw image to separately calculate a correction parameter of the second fish eye lens.

3. The method of claim 1, further comprising:
   storing the correction parameters in the fisheye camera so that the stored correction parameters are applied when the fisheye camera captures a new image.

4. A fisheye camera shadow correction method, comprising:
   capturing and acquiring a raw image using a fisheye camera that when said fisheye camera is not installed in an outer housing;
   obtaining the raw image from the fisheye camera;

performing statistics on luminance information and chrominance information in each block of the raw image;

calculating a correction parameter for the fisheye camera based on the luminance information and the chrominance information of each block;

obtaining the correction parameter;

and correcting an image captured by the fisheye camera using the correction parameter;

wherein the luminance information of each block may be an average luminance value of the block, and the chrominance information of each block may be an average chrominance value of the block;

wherein the correction parameter may comprise a luminance parameter and a chrominance parameter, the luminance parameter may be a first ratio of the average luminance value of a central block and the average luminance value of each block, and the chrominance parameter may be a second ratio of the average chrominance value of a central block and the average chrominance value of each block;

wherein the raw image is captured and acquired in an integrating sphere;

wherein the fisheye camera is disposed and secured in a middle of the integrating sphere using a jig.

5. The method of claim 4, wherein the correction parameter is stored in the fisheye camera.

6. The fisheye camera shadow correction method of claim 4, wherein the fisheye camera comprises two fisheye lenses, the method further comprising: separately obtaining correction parameters for the two fisheye lenses.

7. A fisheye camera shadow correction parameter determination device, comprising:

a raw image obtaining module adapted to obtain a raw image from a fisheye camera, said raw image being captured and acquired when said fisheye camera is not installed in an outer housing;

a statistics module adapted to perform statistics on luminance information and chrominance information in each block of the raw image; and a correction parameter calculation module adapted to calculate a correction parameter for the fisheye camera based on the luminance information and the chrominance information;

wherein the luminance information of each block may be an average luminance value of the block, and the chrominance information of each block may be an average chrominance value of the block;

wherein the correction parameter may comprise a luminance parameter and a chrominance parameter, the luminance parameter may be a first ratio of the average luminance value of a central block and the average luminance value of each block, and the chrominance parameter may be a second ratio of the average chrominance value of a central block and the average chrominance value of each block;

wherein the raw image is captured and acquired in an integrating sphere;

wherein the fisheye camera is disposed and secured in a middle of the integrating sphere using a jig.

8. The fisheye camera shadow correction parameter determination device of claim 7, wherein the fisheye camera comprises two fisheye lenses configured to capture separate first and second raw images; wherein the raw image obtaining module is configured to separately obtain the first raw image and the second raw image from the two fisheye lenses; the first and second raw images for separately calculating correction parameters of the two fisheye lenses.

9. The fisheye camera shadow correction parameter determination device of claim 7, further comprising:

a storage module adapted to store the correction parameters in the fisheye camera so that the stored correction parameters may be applied when the fisheye camera captures a new image.

10. A fisheye camera shadow correction device, comprising:

a correction parameter obtaining module adapted to obtain a correction parameter for a fisheye camera, said correction parameter being calculated and acquired by means of the following method: obtaining a raw image from the fisheye camera, said raw image being captured and acquired when said fisheye camera is not installed in an outer housing; performing statistics on the luminance information and the chrominance information in each block of said raw image; and calculating the correction parameter for said fisheye camera on the basis of the luminance information and the chrominance information of each block; and a correction module adapted to perform correction using said correction parameter on an image captured by the fisheye camera;

wherein the luminance information of each block may be an average luminance value of the block, and the chrominance information of each block may be an average chrominance value of the block;

wherein the correction parameter may comprise a luminance parameter and a chrominance parameter, the luminance parameter may be a first ratio of the average luminance value of a central block and the average luminance value of each block, and the chrominance parameter may be a second ratio of the average chrominance value of a central block and the average chrominance value of each block;

wherein the raw image is captured and acquired in an integrating sphere;

wherein the fisheye camera is disposed and secured in a middle of the integrating sphere using a jig.

11. The fisheye camera shadow correction device of claim 10, wherein the fisheye camera comprises two fisheye lenses and the correction parameter obtaining module is configured to separately obtain correction parameters for the two fisheye lenses.

12. The fisheye camera shadow correction device of claim 10, wherein the fisheye camera is configured to store the correction parameter and the correction parameter obtaining module is configured to obtain the stored correction parameter stored in advance.

* * * * *